United States Patent [19]

Roberts

[11] Patent Number: 4,487,298
[45] Date of Patent: Dec. 11, 1984

[54] DRUM BRAKE ASSEMBLY AND ADJUSTER THEREFOR

[75] Inventor: James K. Roberts, South Bend, Ind.
[73] Assignee: The Bendix Corporation, Southfield, Mich.
[21] Appl. No.: 490,275
[22] Filed: May 2, 1983
[51] Int. Cl.³ .................... F16D 51/52; F16D 65/56
[52] U.S. Cl. .................... 188/79.5 GE; 188/79.5 GC; 188/79.5 P; 188/196 BA
[58] Field of Search ............... 188/331, 333, 79.5 R, 188/79.5 GE, 79.5 GT, 79.5 P, 79.5 S, 79.5 SC, 196 F, 196 BA, 196 V, 79.5 GC

[56] References Cited

U.S. PATENT DOCUMENTS

| | | | |
|---|---|---|---|
| 3,090,469 | 5/1963 | Buckner | 188/79.5 GT |
| 3,114,439 | 12/1963 | Bauman | 188/79.5 GC |
| 3,189,132 | 6/1965 | Mossey | 188/196 BA |
| 3,216,533 | 11/1965 | Hagerty et al. | 188/79.5 GC |
| 3,460,653 | 8/1969 | Wieger | 188/196 BA |
| 3,576,235 | 4/1971 | Bolenbaugh | 188/79.5 GC |

FOREIGN PATENT DOCUMENTS 57-18830  1/1982  Japan .......................... 188/79.5 R Primary Examiner—Douglas C. Butler
Assistant Examiner—R. R. Diefendorf
Attorney, Agent, or Firm—Paul David Schoenle; Ken C. Decker

[57] ABSTRACT

A drum brake assembly and adjuster therefor includes a wire element supporting a pawl and yieldably opposing movement of the pawl away from a rest position. The wire element is releasably connected to the pawl and a brake shoe for the drum brake assembly.

4 Claims, 4 Drawing Figures

DRUM BRAKE ASSEMBLY AND ADJUSTER THEREFOR

This invention relates to a drum brake and adjuster therefor wherein an extendible assembly between the brake shoes cooperates with a pawl to retain the brake shoes closely adjacent a drum.

In U.S. Pat. No. 3,576,235 an extendible assembly is disclosed between adjacent ends of a pair of brake shoes. The extendible assembly cooperates with an adjuster pawl to extend the pair of brake shoes radially outwardly in response to lining wear for the pair of brake shoes. The pawl is mounted on a pin attached to one of the brake shoes and a spring biases the pawl to a rest position fully extending a cable coupled to the brake shoe, the pawl and a backing plate. The adjuster requires a plurality of parts to cooperate with the extendible assembly and each of these parts must be inventoried by a brake manufacturer and assembled together during assembly of the drum brake. Consequently, it is desireable for the adjuster to be simplified with fewer parts.

The present invention covers a drum brake assembly and adjuster therefore comprising a pair of brake shoes cooperating with the drum to brake the latter and an adjustment assembly retaining the pair of brake shoes adjacent the drum, the adjustment assembly comprising an extendible assembly between the pair of brake shoes and a pawl cooperating with the extendible assembly to extend the latter in response to lining wear for the pair of brake shoes, the pawl cooperating with resilient means to yieldably oppose movement away from a rest position, characterized in that said pawl is supported solely by said resilient means in spaced relation to said pair of brake shoes.

It is an advantage of the present invention that a single wire element is used as the resilient means to mount a pawl as well as bias the pawl to its rest position.

The present invention is illustrated in one embodiment in the attached drawings.

Figure 1:
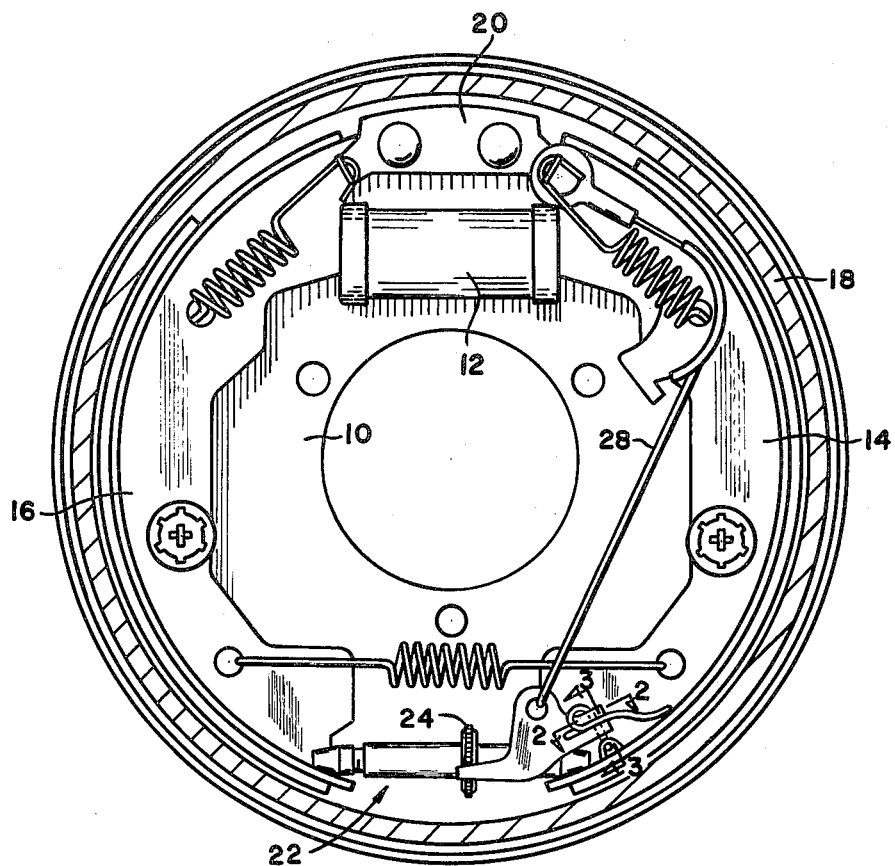
FIG. 1 is a side view of a drum brake assembly.
Figure 2:
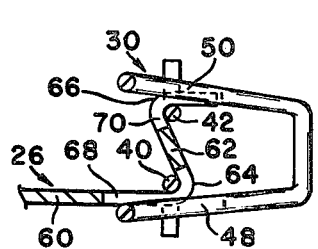
FIG. 2 is a cross-sectional view taken along line 2—2 of FIG. 1.
Figure 3:
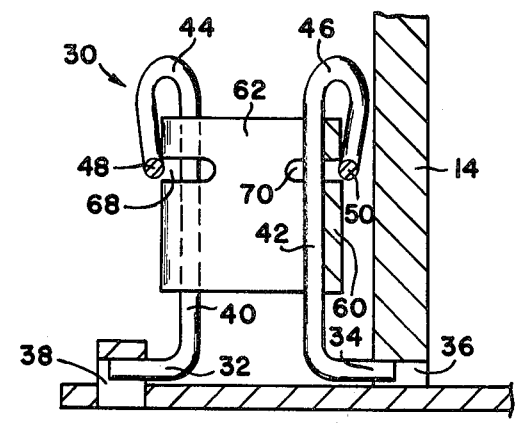
FIG. 3 is a cross-sectional view taken along line 3—3 of FIG. 1.
Figure 4:
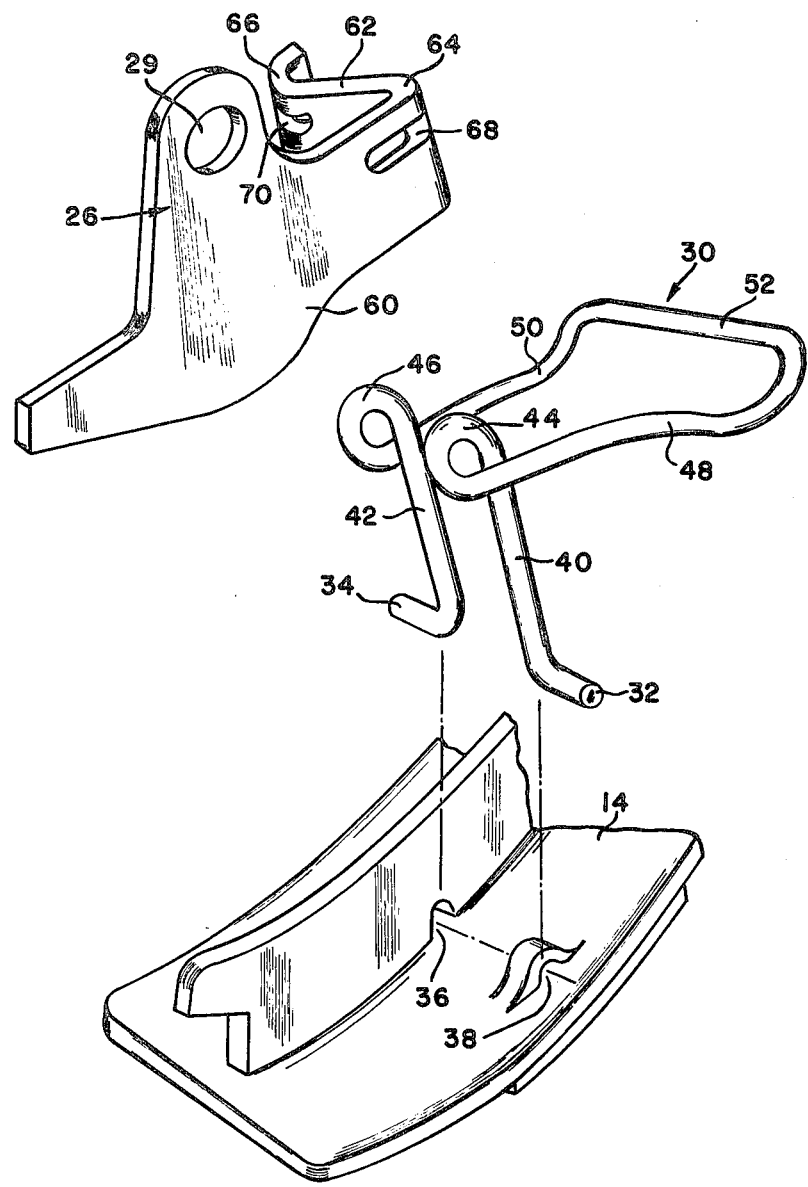
FIG. 4 is an exploded enlarged perspective view of the pawl, wire spring and partial brake shoe.

A drum brake assembly includes a backing plate 10 supporting a wheel cylinder 12 which receives fluid pressure during braking to move a pair of brake shoes 14 and 16 into engagement with a drum 18. An anchor 20 adjacent the wheel cylinder opposes rotation of the pair of brake shoes with the drum to absorb and transfer braking torque to the backing plate 10. An extendible assembly 22 is disposed between the pair of brake shoes 14 and 16 opposite the wheel cylinder 12. The extendible assembly includes a star wheel 24 which is rotatable to extend the length of the extendible assembly in response to lining wear for the pair of brake shoes 14 and 16. A pawl 26 is engageable with the star wheel to control rotation of the latter and a cable 28 extends from the anchor to the pawl opening 29 via the one brake shoe 14 to adjust the position of the pawl on the star wheel in a well known manner.

In accordance with the invention, a wire element 30 is releasably connected to the one brake shoe 14 and also to the pawl 26 to dispose the pawl adjacent the star wheel of the extendible assembly. The wire element includes a pair of ends 32 and 34 extending, respectively, into a web opening 36 of brake shoe 14 and a rim aperture 38 of brake shoe 14. A pair of legs 40 and 42 extend radially from the ends 32 and 34 to define a pair of loops 44 and 46 cooperating with the pawl as more fully described hereinafter. The wire element extends from the loops 44 and 46 via a pair of arms 48 and 50 to a common middle portion 52 engageable with the one brake shoe rim remote from the ends 32 and 34.

The pawl 26 is substantially L-shaped in an axial plane with a first flat side 60 engageable with the star wheel 24 and a second side 62 extending substantially perpendicular to said first flat side. The second side is provided with slightly folded sections 64 and 66 such that leg 40 is received within the folded section 64 and leg 42 is received within the folded section 66. The first side 60 and the second side 62 form a recess 68 intersecting the fold 64 while the second side 62 forms a recess 70 intersecting the fold 66.

In order to attach the wire element 30 to the pawl 26, the side 62 is disposed between the legs 40 and 42 slightly above the ends 32 and 34 so that the leg 40 is contacting the fold 64. The pawl 26 is rotated about leg 42 to position fold 66 over leg 42, and then the pawl 26 is moved toward loops 44 and 46. The pawl interferes with the legs 48 and 50 immediately adjacent the loops 44 and 46 to spread the legs apart enough to move the pawl toward the loops until the loops are aligned with the recesses 68 and 70. The loops spring into the recesses to releasably connect the wire element to the pawl. Thereafter, the legs 40 and 42 adjacent the ends 32 and 34 are biased together to fit the ends 32 and 34 within the rim aperture 38 and the web opening 36, respectively. It is also possible to releasably attach the wire element 30 to the brake shoe 14 before the pawl 26 is releasably attached to the wire element.

The drum brake and adjuster operate in a conventional manner to control extension of the extendible assembly in response to lining wear for the brake shoes. However, when the pawl is required to index to a successive tooth, the cable 28 causes the pawl to rotate clockwise relative to the one brake shoe 14. This rotation for the pawl causes the arms 48 and 50 to deflect in view of the flexibility of the wire element so that the middle portion 52 slides on the one brake shoe rim. Viewing FIG. 1, the pawl is rotated in a clockwise direction about the ends 32 and 34 while the portion 52 slides away from the ends 32 and 34 on the rim of brake shoe 14.

In view of the foregoing description, it is seen that the singular wire element 30 supports the pawl 26 while the flexible arms 48 and 50 resiliently oppose rotation of the pawl away from its rest position. Moreover, the wire element is readily coupled to the pawl and brake shoe via releasable connections to permit easy assembly and disassembly.

I claim:

1. A drum brake assembly and adjuster therefor comprising a pair of brake shoes cooperating with the drum to brake the latter and an adjustment assembly retaining the pair of brake shoes adjacent the drum, the adjustment assembly comprising an extendible assembly between the pair of brake shoes and a pawl cooperating with the extendible assembly to extend the latter in response to lining wear of the pair of brake shoes, resilient means cooperating with the pawl to yieldably oppose movement of the pawl away from a rest position, said pawl being substantially supported by said resilient means in spaced relation to said pair of brake shoes, said resilient means including a first leg pivotally coupled to said one brake shoe and an arm slidably engageable with said one brake shoe, said leg and arm forming a loop therebetween, and said loop cooperating with said leg and arm to releasably connect said pawl to said resilient means.

2. A drum brake assembly and adjuster therefor comprising a pair of brake shoes cooperating with the drum to brake the latter and an adjustment assembly retaining the pair of brake shoes adjacent the drum, the adjustment assembly comprising an extendible assembly between the pair of brake shoes and a pawl cooperating with the extendible assembly to extend the latter in response to lining wear of the pair of brake shoes, resilient means cooperating with the pawl to yieldably oppose movement of the pawl away from a rest position, said pawl being supported substantially by said resilient means in spaced relation to said pair of brake shoes, said resilient means comprising a wire element with a pair of ends forming a releasable connection with one of said pair of brake shoes, said wire element including a pair of loops releasably coupled to said pawl and said wire element including a portion spaced from said ends which slidably engages said one brake shoe.

3. A drum brake assembly and adjuster therefor comprising a pair of brake shoes engageable with the drum to brake the latter, an extendible assembly extending between the pair of brake shoes to substantially define a rest position for the latter, a pawl cooperating with the extendible assembly to extend the latter in response to lining wear of the pair of brake shoes and means cooperating with one of the pair of brake shoes and the pawl to dispose the latter adjacent the extendible assembly, said means being defined by a wire element forming a first releasable connection with said one brake shoe and a second releasable connection with said pawl, said wire element being flexible to permit said pawl to move relative to said extendible assembly, said wire element including a pair of ends cooperating with said one brake shoe to form said first releasable connection, a middle section engageable with said one brake shoe and a pair of loops intermediate said ends and said middle section, said pair of loops cooperating with said pawl to define said second releasable connection.

4. A drum brake assembly and adjuster therefor comprising a pair of brake shoes engageable with the drum to brake the latter, an extendible assembly extending between the pair of brake shoes to substantially define a rest position for the latter, a pawl cooperating with the extendible assembly to extend the latter in response to lining wear of the pair of brake shoes and means cooperating with one of the pair of brake shoes and the pawl to dispose the latter adjacent the extendible assembly, characterized in that said means is defined by a wire element forming a first releasable connection with said one brake shoe and a second releasable connection with said pawl, said wire element is flexible to permit said pawl to move relative to said extendible assembly, said pawl is formed with a pair of folds defining a pair of grooves and said pawl is formed with a pair of recesses so that said wire element is disposed in the pair of grooves and the pair of recesses to attach said wire element to said pawl.

* * * * *